(12) United States Patent
Kachmar et al.

(10) Patent No.: US 11,481,341 B2
(45) Date of Patent: Oct. 25, 2022

(54) SYSTEM AND METHOD FOR DYNAMICALLY ADJUSTING PRIORITY-BASED ALLOCATION OF STORAGE SYSTEM RESOURCES

(71) Applicant: EMC IP Holding Company, LLC, Hopkinton, MA (US)

(72) Inventors: Maher Kachmar, Marlborough, MA (US); Philippe Armangau, Acton, MA (US); Michael P. Wahl, Bulverde, TX (US); Vamsi Vankamamidi, Hopkinton, MA (US); Yubing Wang, Southborough, MA (US); Christopher Seibel, Walpole, MA (US); Christopher J. Jones, North Attleboro, MA (US); James Vega McCoy, Holliston, MA (US)

(73) Assignee: EMC IP HOLDING COMPANY, LLC, Hopkinton, MA (US)

(*) Notice: Subject to any disclaimer, the term of this patent is extended or adjusted under 35 U.S.C. 154(b) by 61 days.

(21) Appl. No.: 17/083,564

(22) Filed: Oct. 29, 2020

(65) Prior Publication Data

US 2022/0138117 A1   May 5, 2022

(51) Int. Cl.
*G06F 13/16* (2006.01)
*G06F 9/50* (2006.01)

(52) U.S. Cl.
CPC .............. *G06F 13/16* (2013.01); *G06F 9/505* (2013.01); *G06F 9/5038* (2013.01); *G06F 2213/16* (2013.01)

(58) Field of Classification Search
CPC ....... G06F 13/16; G06F 9/5038; G06F 13/505
See application file for complete search history.

(56) References Cited

U.S. PATENT DOCUMENTS

| | | | |
|---|---|---|---|
| 9,973,547 B1* | 5/2018 | Simms | H04L 47/22 |
| 2005/0160188 A1* | 7/2005 | Bogin | G06F 13/161 710/1 |
| 2013/0173845 A1* | 7/2013 | Aslam | G06F 12/0871 711/E12.008 |
| 2017/0371785 A1* | 12/2017 | Boyd | G06F 13/16 |
| 2020/0228462 A1* | 7/2020 | Bohra | H04L 47/788 |

* cited by examiner

Primary Examiner — Henry Tsai
Assistant Examiner — Christopher A Daley
(74) Attorney, Agent, or Firm — Brian J. Colandreo; Mark H. Whittenberger; Holland & Knight LLP

(57) ABSTRACT

A method, computer program product, and computing system for defining a token pool size for a storage system token pool associated with a storage system. An input/output (IO) processing load for the storage system may be determined. The token pool size for the storage system token pool associated with the storage system may be dynamically adjusted based upon, at least in part, one or more changes in the IO processing load determined for the storage system.

14 Claims, 5 Drawing Sheets

SYSTEM AND METHOD FOR DYNAMICALLY ADJUSTING PRIORITY-BASED ALLOCATION OF STORAGE SYSTEM RESOURCES

BACKGROUND

Storing and safeguarding electronic content may be beneficial in modern business and elsewhere. Accordingly, various methodologies may be employed to protect and distribute such electronic content.

Determining a total number of "tokens" that represent the processing capacity of storage array cannot be programmed easily though conventional algorithms due to ever-changing front workloads and internal background processing jobs. As such, incorrectly determining a "token pool size" representative of the processing capacity of the storage may cause issues with a resource allocator that enforces quality-of-service (QoS) between volume priorities by allocating the "tokens" to particular IO requests.

SUMMARY OF DISCLOSURE

In one example implementation, a computer-implemented method executed on a computing device may include, but is not limited to, defining a token pool size for a storage system token pool associated with a storage system. An input/output (IO) processing load for the storage system may be determined. The token pool size for the storage system token pool associated with the storage system may be dynamically adjusted based upon, at least in part, one or more changes in the IO processing load determined for the storage system.

One or more of the following example features may be included. Determining the IO processing load for the storage system may include determining one or more of: a data path latency, an IO rate, and an IO queue time for the storage system. Dynamically adjusting the token pool size for the storage system token pool associated with the storage system based upon, at least in part, the one or more changes in the IO processing load determined for the storage system may include one or more of: determining whether an IO rate slope is one of: up, down, and constant; determining whether an IO queue time slope is one of: up, down, and constant; and determining whether the data path latency is one of: increasing, downward, and constant. Dynamically adjusting the token pool size for the storage system token pool associated with the storage system based upon, at least in part, the one or more changes in the IO processing load determined for the storage system may include: determining that the IO rate slope is upward and that the IO queue time slope is up; and incrementing the token pool size for the storage system token pool associated with the storage system by a first amount. Dynamically adjusting the token pool size for the storage system token pool associated with the storage system based upon, at least in part, the one or more changes in the IO processing load determined for the storage system may include: determining that the IO rate slope is downward and that the IO queue time slope is downward; and decrementing the token pool size for the storage system token pool associated with the storage system by the first amount. Dynamically adjusting the token pool size for the storage system token pool associated with the storage system based upon, at least in part, the one or more changes in the IO processing load determined for the storage system may include: determining that the IO rate slope is constant and that the IO queue time slope is one of upward and constant; and one of: incrementing the token pool size for the storage system token pool associated with the storage system by a second amount when the data latency is increasing; and decrementing the token pool size for the storage system token pool associated with the storage system by the second amount when the data latency is one of downward and constant. One or more tokens from the storage system token pool associated with the storage system may be allocated for executing one or more IO requests based upon, at least in part, the token pool size and one or more priority levels associated with the one or more IO requests.

In another example implementation, a computer program product resides on a computer readable medium that has a plurality of instructions stored on it. When executed by a processor, the instructions cause the processor to perform operations that may include, but are not limited to, defining a token pool size for a storage system token pool associated with a storage system. An input/output (IO) processing load for the storage system may be determined. The token pool size for the storage system token pool associated with the storage system may be dynamically adjusted based upon, at least in part, one or more changes in the IO processing load determined for the storage system.

One or more of the following example features may be included. Determining the IO processing load for the storage system may include determining one or more of: a data path latency, an IO rate, and an IO queue time for the storage system. Dynamically adjusting the token pool size for the storage system token pool associated with the storage system based upon, at least in part, the one or more changes in the IO processing load determined for the storage system may include one or more of: determining whether an IO rate slope is one of: up, downward, and constant; determining whether an IO queue time slope is one of: up, downward, and constant; and determining whether the data path latency is one of: increasing, downward, and constant. Dynamically adjusting the token pool size for the storage system token pool associated with the storage system based upon, at least in part, the one or more changes in the IO processing load determined for the storage system may include: determining that the IO rate slope is upward and that the IO queue time slope is up; and incrementing the token pool size for the storage system token pool associated with the storage system by a first amount. Dynamically adjusting the token pool size for the storage system token pool associated with the storage system based upon, at least in part, the one or more changes in the IO processing load determined for the storage system may include: determining that the IO rate slope is downward and that the IO queue time slope is downward; and decrementing the token pool size for the storage system token pool associated with the storage system by the first amount. Dynamically adjusting the token pool size for the storage system token pool associated with the storage system based upon, at least in part, the one or more changes in the IO processing load determined for the storage system may include: determining that the IO rate slope is constant and that the IO queue time slope is one of upward and constant; and one of: incrementing the token pool size for the storage system token pool associated with the storage system by a second amount when the data latency is increasing; and decrementing the token pool size for the storage system token pool associated with the storage system by the second amount when the data latency is one of downward and constant. One or more tokens from the storage system token pool associated with the storage system may be allocated for executing one or more IO requests based upon, at least in part, the token pool size and one or more priority levels associated with the one or more IO requests.

In another example implementation, a computing system includes at least one processor and at least one memory architecture coupled with the at least one processor, wherein the at least one processor is configured to define a token pool size for a storage system token pool associated with a storage system. The at least one processor may be further configured to determine an input/output (IO) processing load for the storage system. The at least one processor may be further configured to dynamically adjust the token pool size for the storage system token pool associated with the storage system based upon, at least in part, one or more changes in the IO processing load determined for the storage system.

One or more of the following example features may be included. Determining the IO processing load for the storage system may include determining one or more of: a data path latency, an IO rate, and an IO queue time for the storage system. Dynamically adjusting the token pool size for the storage system token pool associated with the storage system based upon, at least in part, the one or more changes in the IO processing load determined for the storage system may include one or more of: determining whether an IO rate slope is one of: up, downward, and constant; determining whether an IO queue time slope is one of: up, downward, and constant; and determining whether the data path latency is one of: increasing, downward, and constant. Dynamically adjusting the token pool size for the storage system token pool associated with the storage system based upon, at least in part, the one or more changes in the IO processing load determined for the storage system may include: determining that the IO rate slope is upward and that the IO queue time slope is up; and incrementing the token pool size for the storage system token pool associated with the storage system by a first amount. Dynamically adjusting the token pool size for the storage system token pool associated with the storage system based upon, at least in part, the one or more changes in the IO processing load determined for the storage system may include: determining that the IO rate slope is downward and that the IO queue time slope is downward; and decrementing the token pool size for the storage system token pool associated with the storage system by the first amount. Dynamically adjusting the token pool size for the storage system token pool associated with the storage system based upon, at least in part, the one or more changes in the IO processing load determined for the storage system may include: determining that the IO rate slope is constant and that the IO queue time slope is one of upward and constant; and one of: incrementing the token pool size for the storage system token pool associated with the storage system by a second amount when the data latency is increasing; and decrementing the token pool size for the storage system token pool associated with the storage system by the second amount when the data latency is one of downward and constant. One or more tokens from the storage system token pool associated with the storage system may be allocated for executing one or more IO requests based upon, at least in part, the token pool size and one or more priority levels associated with the one or more IO requests.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
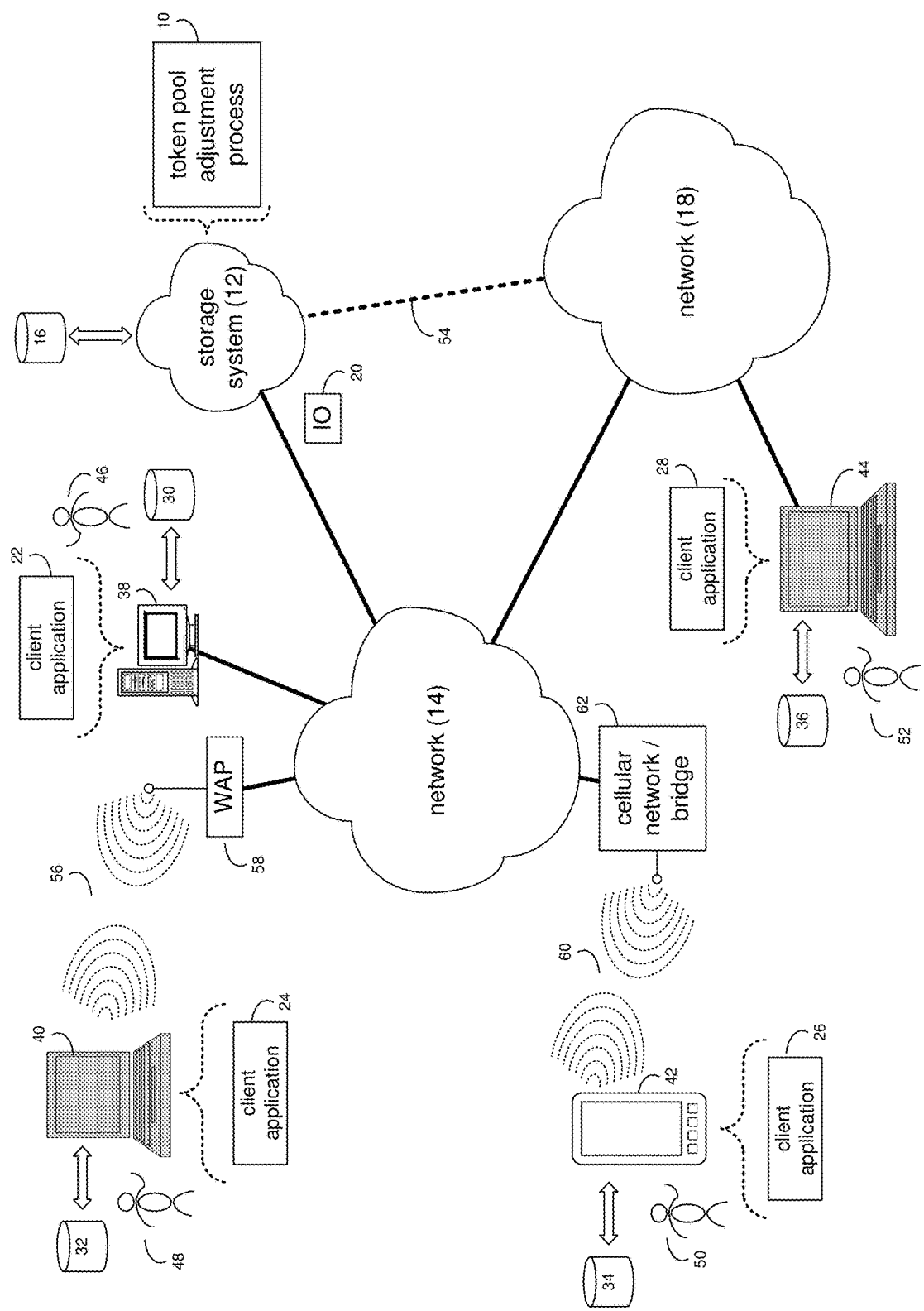
FIG. 1 is an example diagrammatic view of a storage system and a token pool adjustment process coupled to a distributed computing network according to one or more example implementations of the disclosure.

System Overview:

Referring to FIG. 1, there is shown token pool adjustment process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of token pool adjustment process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of token pool adjustment process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a token pool adjustment process, such as token pool adjustment process 10 of FIG. 1, may include but is not limited to, defining a token pool size for a storage system token pool associated with a storage system. An input/output (IO) processing load for the storage system may be determined. The token pool size for the storage system token pool associated with the storage system may be dynamically adjusted based upon, at least in part, one or more changes in the 10 processing load determined for the storage system.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
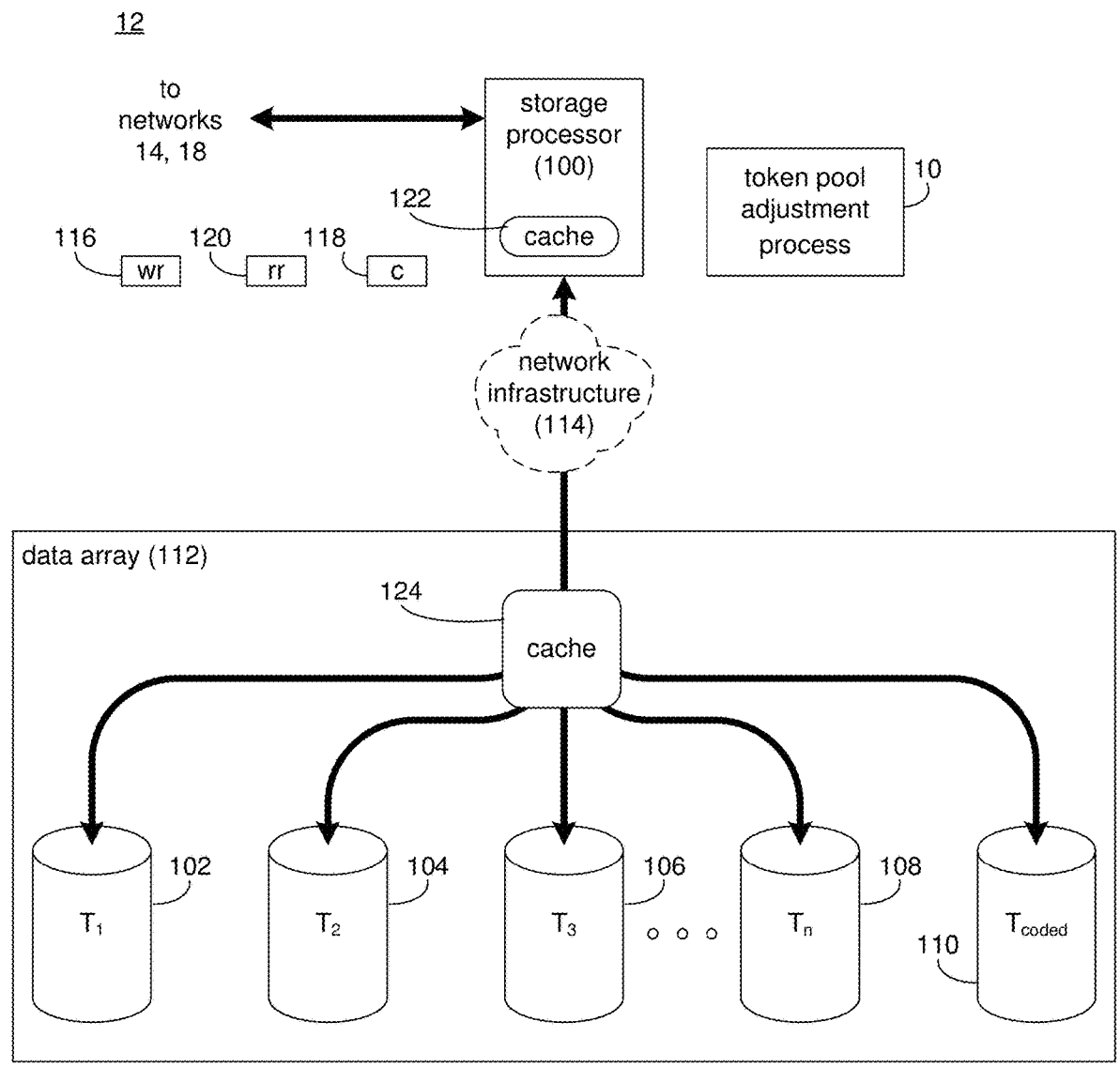
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-$n$ (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of token pool adjustment process 10. The instruction sets and subroutines of token pool adjustment process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of token pool adjustment process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of token pool adjustment process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of token pool adjustment process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 3:
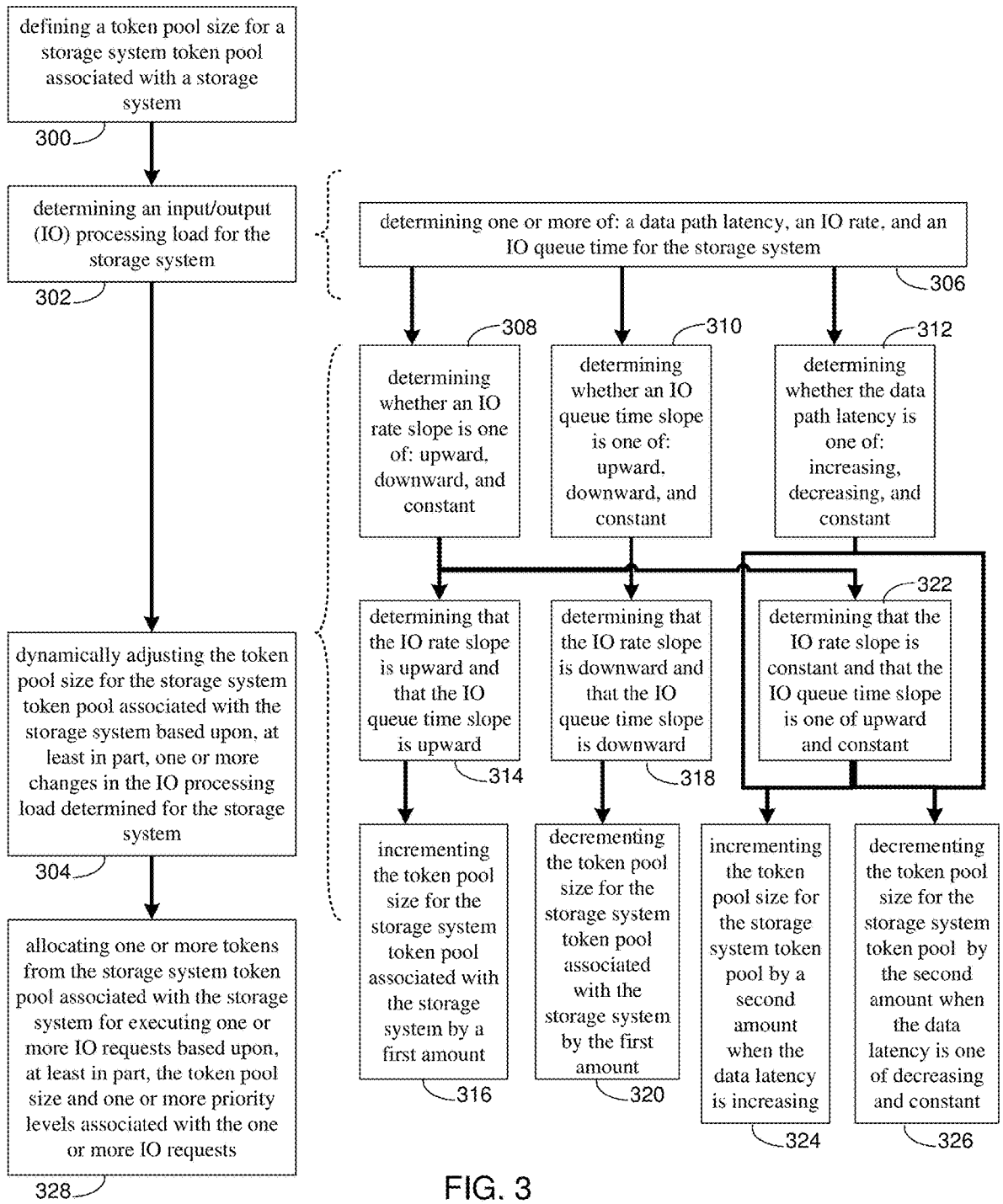
FIG. 3 is an example flowchart of token pool adjustment process according to one or more example implementations of the disclosure.
Figure 4:
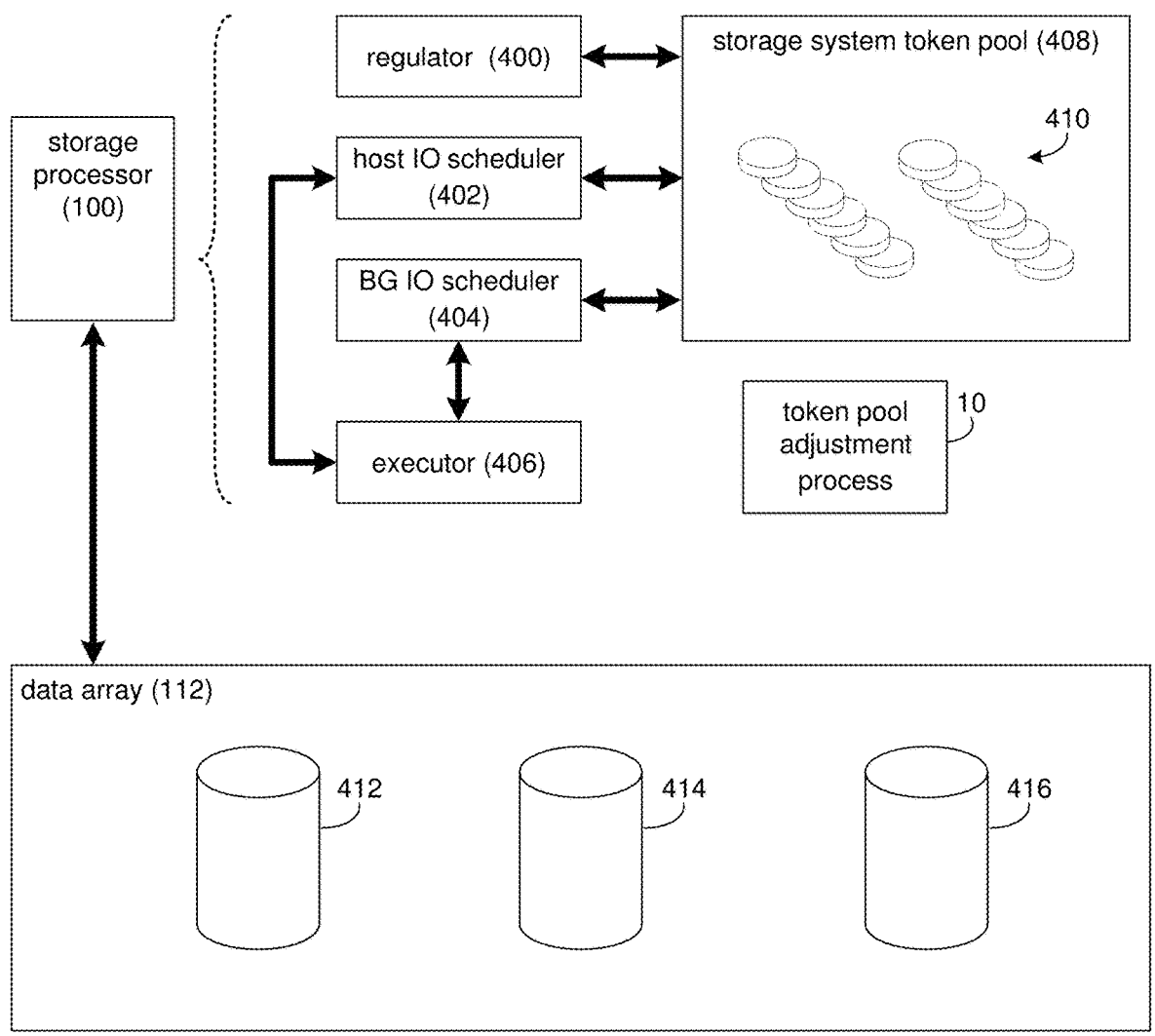
FIG. 4 is an example diagrammatic view of the storage system of FIG. 1 according to one or more example implementations of the disclosure.
Figure 5:
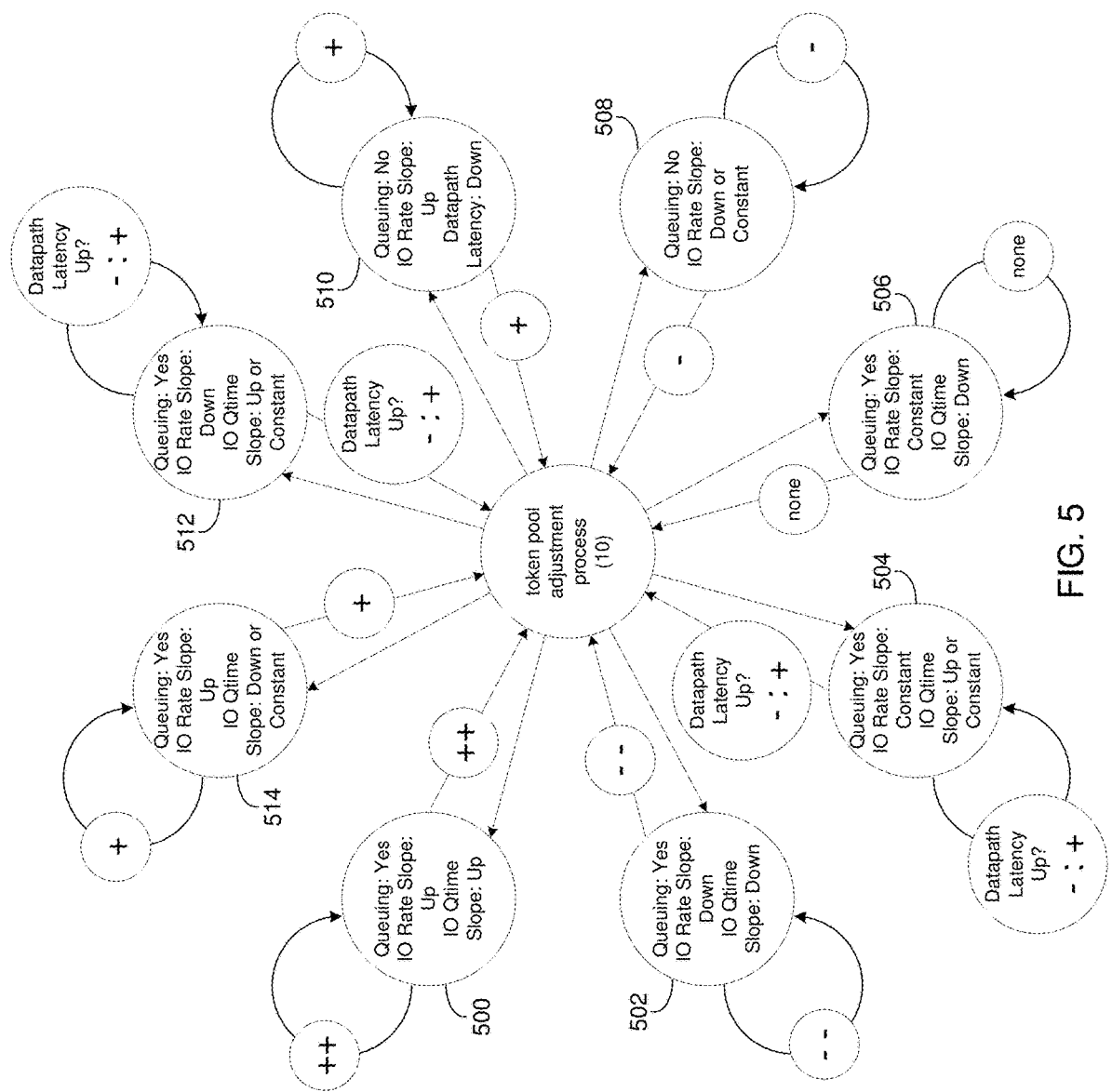
FIG. 5 is an example state diagram of token pool adjustment process according to one or more example implementations of the disclosure.

The Token Pool Adjustment Process:

Referring also to the examples of FIGS. 3-5 and in some implementations, token pool adjustment process 10 may define 300 a token pool size for a storage system token pool associated with a storage system. An input/output (IO) processing load for the storage system may be determined 302. The token pool size for the storage system token pool associated with the storage system may be dynamically adjusted 304 based upon, at least in part, one or more changes in the IO processing load determined for the storage system.

As will be discussed in greater detail below, implementations of the present disclosure may allow for dynamic adjustment of a token pool size for a storage system which may be allocated to various quality-of-service (QoS) priorities. For example, determining the correct token pool size that represents the processing capacity of storage array cannot be programmed easily though conventional algorithms due to ever-changing front workloads and internal background processing jobs. Thus, getting the size of this token pool incorrectly may cause issues with a resource allocator that enforces QoS between volume priorities.

As will be discussed below, and referring at least to the example of FIG. 4, token pool adjustment process 10 may define 300 a token pool size for a storage system token pool associated with a storage system. The host input/output (IO) may generally be considered as the IO load from host applications to volumes in the storage system. Different volumes may be configured with different quality-of-service (QoS) settings based on the requirements of the applications performing the IO requests. This in turn may determine the relative priority of host IO requests to different volumes. A "regulator" component (e.g., regulator 400) of token pool adjustment process 10 may be responsible for regulating the execution of host IO and internal background operations. Its goal may be to minimize the impact of executing background operations on host IO performance while also making sure that background operations do not back-up to the internal limits of the system. Background operations may be generally considered as the IO load generated by internal background operations such as, e.g., garbage-collection, volume-delete processing, drive rebuilds, etc. Background operations set the priority of the IO requests they generate based on their needs which change dynamically.

As will be discussed in greater detail below, token pool adjustment process 10 may achieve this by, for example purposes only, distributing scheduling "tokens" to a host IO scheduler (e.g., host IO scheduler 402 that is responsible for selecting volumes and scheduling their IO requests based on the QoS settings and fairness to all volumes) and background operation scheduler (e.g., background (BG) IO scheduler 404 that is responsible for selecting which background operations to scheduled next, based on the priority that background operations have set for their IO requests and fairness across all operations) during each scheduling cycle. These schedulers may be responsible for orchestration (e.g., deciding which IO requests to schedule based on the scheduling "tokens" available). To decide on scheduling "tokens," token pool adjustment process 10 may continuously (or intermittently) determine 302 an input/output (IO) processing load for the storage system. Generally, an executor (e.g., executor 406) may be responsible for executing the operations that both schedulers have selected in each scheduling cycle. The executor may have per-core queues into which schedulers enqueue their operations. As long as a CPU core is available for the executor, it may pick the next operation in that core's queue in FIFO order for execution.

In some implementations, token pool adjustment process 10 may define 300 a token pool size for a storage system token pool associated with a storage system. As discussed above, a storage system token pool may generally include a pool or collection of discrete "tokens" that may define the processing capability of a storage system. As discussed above, an IO request (e.g., a host IO or a background IO) may require a certain amount of resources of the storage system to be executed. In some implementations, token pool adjustment process 10 may allocate resources for the execution of IO requests in the form of tokens.

In some implementations, token pool adjustment process 10 may define 300 an initial token pool size for the storage system token pool based upon, at least in part, a default token pool size and/or the determination of one or more hardware and/or software components in the storage system. For example, token pool adjustment process 10 may define 300 a default initial token pool size where the number of tokens is a predefined, default number of tokens.

In some implementations, token pool adjustment process 10 may define 300 an initial token pool size where the number of tokens is algorithmically determined based upon, at least in part, the performance characteristics of one or more hardware and/or software components of the storage system. For example, token pool adjustment process 10 may define 300 an initial token pool size based upon, at least in part, the number of CPU cores, amount of cache memory, type of storage devices (e.g., hard disk or solid-state), number of storage devices, type of storage protocol (e.g., SCSI, NVMe, etc.), etc. While examples of various hardware and/or software components have been described in the defining of the token pool size, it will be appreciated that any hardware and/or software component(s) may be used to define 300 the token pool size within the scope of the present disclosure.

Referring again to the example of FIG. 4 and in some implementations, token pool adjustment process 10 may define 300 a token pool size for a storage system token pool (e.g., storage system token pool 408) associated with a storage system (e.g., storage system 12). For example, token pool adjustment process 10 may define 300 the token pool size for storage system token pool 408 as a default number of tokens and/or based upon, at least in part, the hardware and/or software components of storage system 12. In this example, suppose token pool adjustment process 10 defines 300 a token pool size of e.g., 100 tokens. As will be discussed in greater detail below, token pool adjustment process 10 may dynamically adjust 304 the token pool size and allocate one or more tokens from the storage system token pool for one or more IO requests.

In some implementations, token pool adjustment process 10 may determine 302 an input/output (IO) processing load for the storage system. As discussed above, defining a token pool size through conventional algorithms/approaches may not be possible due to ever-changing front workloads and internal background processing jobs of a storage system. As such, it may be difficult for conventional algorithms/approaches to adapt to the processing capacity of a storage system. In some implementations, token pool adjustment process 10 may determine 302 an IO processing load for the storage system. For example, the IO processing load for the storage system may generally include performance metrics associated with the processing of IO requests by the storage system.

In some implementations, determining 302 the IO processing load for the storage system may include determining 308 one or more of: a data path latency, an IO rate, and an IO queue time for the storage system. As discussed above, determining 302 the IO processing load for the storage system may include determining various performance metric associated with the processing of IO requests by the storage system. For example, determining 302 the IO processing load may include determining 306 a data path latency. As is known in the art, data path latency may generally include a measurement of the time delay from receiving the IO request (e.g., from a host) to storing the data of the IO and/or receiving an acknowledgment signal indicating that the data of the IO request has been processed (e.g., a response from an IO write request) and/or receiving the results of the IO request (e.g., data received from a read request). In some implementations, token pool adjustment process 10 may determine 306 an average data path latency for the storage system.

In some implementations, determining 302 the IO processing load may include determining 306 an IO rate. An IO rate may generally include the rate at which IO requests are processed by the storage system. One example IO rate that may be determined 302 is an input/output per second (IOPS) metric. However, it will be appreciated that other IO rates may be determined within the scope of the present disclosure.

In some implementations, determining 302 the IO processing load may include determining 306 an IO queue time for the storage system. In some implementations, the IO queue time may generally include an amount of time IO requests are queued in the storage system. For example, token pool adjustment process 10 may determine an average amount of time IO requests spend queued in the storage system. While examples of determining a data path latency, IO rate, and IO queue time have been provided for determining the IO processing load for the storage system, it will be appreciated that other performance metrics may be determined within the scope of the present disclosure.

In some implementations, token pool adjustment process 10 may dynamically adjust 304 the token pool size for the storage system token pool associated with the storage system based upon, at least in part, one or more changes in the IO processing load determined for the storage system. As discussed above and in some implementations, the IO processing load may change over time during the operation of the storage system. For example, there may be periods of significant IO traffic to one particular volume or volumes of a particular QoS priority level, there may be periods of no IO traffic to any volume, etc. As such, it may be difficult using conventional token pool sizing algorithms to account for these changes to an IO processing load. In some implementations, token pool adjustment process 10 may be configured to continuously or intermittently determine 302 the IO processing load for the storage system. For example, token pool adjustment process 10 may be configured to sample the IO processing load of the storage system periodically. In some implementations, the frequency for determining 302 the IO processing load may be a default frequency, a user-defined frequency (e.g., via a user interface), and/or defined automatically by token pool adjustment process 10. In this manner, token pool adjustment process 10 may determine one or more changes in the IO processing load of the storage system.

In some implementations, dynamically adjusting 304 the token pool size for the storage system token pool associated with the storage system based upon, at least in part, the one or more changes in the IO processing load determined for the storage system may include one or more of: determining 308 whether an IO rate slope is one of: up, downward, and constant; determining 310 whether an IO queue time slope is one of: up, downward, and constant; and determining 312 whether the data path latency is one of: increasing, downward, and constant. In some implementations and as discussed above, token pool adjustment process 10 may continuously and/or intermittently determine 302 the IO processing load of the storage system. In some implementations, token pool adjustment process 10 may determine one or more changes in the IO processing load of the storage system. For example and as discussed above, token pool adjustment process 10 may determine 306 data path latency, an IO rate, an IO queue time, etc. for a storage system. In some implementations, these performance metrics may change. Accordingly, token pool adjustment process 10 may determine whether these performance metrics are changing and/or whether a rate of change (i.e., a slope) of these performance metrics is increasing, downward, or is constant.

Referring also to the example of FIG. 5 and in some implementations, token pool adjustment process 10 may be represented in a state diagram. In some implementations, token pool adjustment process 10 may function as a stochastic transition matrix for transitioning between various states (e.g., states 500, 502, 504, 506, 508, 510, 512, 514) representative of particular changes in the IO processing load of the storage system. As will be discussed in greater detail below, token pool adjustment process 10 may dynamically or adaptively adjust 304 the token pool size of the storage system token pool based upon, at least in part, the one or more changes to the IO processing load determined for the storage system.

In some implementations, token pool adjustment process 10 may determine whether any IO requests have been queued since calibration. In some implementations, token pool adjustment process 10 may calibrate a storage system and/or portions of the storage system before and/or during the processing of IO requests on the storage system. For example, calibration may occur periodically at a default frequency, a user-defined frequency (e.g., via a user interface), and/or at a frequency defined automatically by token pool adjustment process 10. Calibration may generally include holding off the processing of background IO requests to observe the host IO performance. In some implementations, token pool adjustment process 10 may determine whether any IO requests have been queued since the last calibration.

Referring again to the example of FIG. 5 and in some implementations, token pool adjustment process 10 may determine whether any IO requests have been queued since calibration. For example, suppose token pool adjustment process 10 determines that at least one IO request has been queued since the last calibration. In this example, token pool adjustment process 10 may account for the queueing of at least one IO request in states 500, 502, 504, 506, 512, and 514 as "Queuing: Yes". In another example, suppose token pool adjustment process 10 determines that no IO requests have been queued since the last calibration. In this example, token pool adjustment process 10 may account for no queueing of IO requests in states 508 and 510 as "Queuing: No".

In some implementations, dynamically adjusting 304 the token pool size for the storage system token pool based upon, at least in part, the one or more changes in the IO processing load determined for the storage system may include determining 314 that the IO rate slope is increasing and that the IO queue time slope is increasing, and incrementing 316 the token pool size for the storage system token pool by a first amount. For example, token pool adjustment process 10 may determine that the IO rate slope is upward (i.e., the IO rate slope is positive) and that the IO queue time slope is upward (i.e., the IO queue time slope is positive). In some implementations, token pool adjustment process 10 may, in response to determining 314 that the IO rate slope is upward and that the IO queue time slope is up, increment 316 the token pool size for the storage system token pool associated with the storage system by a first amount. In some implementations, incrementing the token pool size may generally include adding to or increasing the number of tokens in the storage system token pool.

In some implementations, incrementing by the first amount may generally include a "fast" increment or a high-valued increment. In some implementations, the determination of the first or "fast" amount for incrementing the token pool size may be based upon, at least in part, one or more hardware and/or software components of the storage system. For example, token pool adjustment process 10 may determine the first amount based upon, at least in part, the number of CPU cores, amount of cache memory, type of storage devices (e.g., hard disk or solid-state), number of storage devices, the type of storage protocol (e.g., SCSI, NVMe, etc.), etc. In this manner, token pool adjustment process 10 may provide a high increase or increment in the token pool size relative to the processing capability of the storage system based upon, at least in part, the positive IO rate slope and the positive IO queue time slope.

Referring again to FIG. 5 and in one example, suppose token pool adjustment process 10 determines 314 that at least one IO request has been queued since calibration, that the IO rate slope is upward (i.e., increase from 1000 IOPS to 1200 IOPS), and that the IO queue time slope is upward (i.e., increase from 10 seconds to 12 seconds). In this example, token pool adjustment process 10 may satisfy the conditions of state 500 and may transition to state 500. Accordingly, token pool adjustment process 10 may increment 316 the token pool size by the first amount (e.g., represented in FIG. 5 by "++"). As shown in the example of FIG. 5, token pool adjustment process 10 may iteratively increment 316 the token pool size while the conditions of state 500 are met (e.g., IO rate slope is upward and IO queue time slope is up).

In some implementations, dynamically adjusting 304 the token pool size for the storage system token pool based upon, at least in part, the one or more changes in the IO processing load determined for the storage system may include determining 318 that the IO rate slope is downward and that the IO queue time slope is downward and decrementing 320 the token pool size for the storage system token pool by the first amount. For example, token pool adjustment process 10 may determine that the IO rate slope is downward (i.e., the IO rate slope is negative) and that the IO queue time slope is downward (i.e., the IO queue time slope is negative). In some implementations, token pool adjustment process 10 may, in response to determining 318 that the IO rate slope is downward and that the IO queue time slope is downward, decrement 320 the token pool size for the storage system token pool associated with the storage system by the first amount.

In some implementations, decrementing by the first amount may generally include a "fast" decrement or a high-valued decrement. In some implementations, the determination of the first or "fast" amount for decrementing the token pool size may be based upon, at least in part, one or more hardware and/or software components of the storage system. For example, token pool adjustment process 10 may determine the first amount based upon, at least in part, the number of CPU cores, amount of cache memory, type of storage devices (e.g., hard disk or solid-state), number of storage devices, the type of storage protocol (e.g., SCSI, NVMe, etc.), etc. In this manner, token pool adjustment process 10 may provide a high decrease or decrement in the token pool size relative to the processing capability of the storage system based upon, at least in part, the downward IO rate slope and the downward IO queue time slope. In some implementations, the first amount may be the same for either incrementing or decrementing the token pool size.

Referring again to FIG. 5 and in one example, suppose token pool adjustment process 10 determines 318 that at least one IO request has been queued since calibration, that the IO rate slope is downward (i.e., decrease from 1000 IOPS to 800 IOPS), and that the IO queue time slope is downward (i.e., decrease from 10 seconds to 8 seconds). In this example, token pool adjustment process 10 may satisfy the conditions of state 502 and may transition to state 502. Accordingly, token pool adjustment process 10 may decrement 320 the token pool size by the first amount (e.g., represented in FIG. 5 by "– –"). As shown in the example of FIG. 5, token pool adjustment process 10 may iteratively decrement 320 the token pool size while the conditions of state 502 are met (e.g., IO rate slope is downward and IO queue time slope is downward).

In some implementations, dynamically adjusting 301 the token pool size for the storage system token pool associated with the storage system based upon, at least in part, the one or more changes in the IO processing load determined for the storage system may include determining 322 that the IO rate slope is constant and that the IO queue time slope is one of upward and constant; and one of: incrementing 324 the token pool size for the storage system token pool associated with the storage system by a second amount when the data latency is increasing; and decrementing 326 the token pool size for the storage system token pool associated with the storage system by the second amount when the data latency is one of downward and constant. For example, token pool adjustment process 10 may determine that the IO rate slope is constant (i.e., the IO rate slope is flat) and that the IO queue time slope is either upward or constant (i.e., the IO queue time slope is upward or constant). In some implementations, token pool adjustment process 10 may, in response to determining 322 that the IO rate slope is constant and that the IO queue time slope is either upward or constant, increment 324 the token pool size for the storage system token pool by a second amount when the data latency is increasing, or decrement 326 the token pool size for the storage system token pool by the second amount when the data latency is one of decreasing and constant.

In some implementations, in response to determining 322 that the IO rate slope is constant and that the IO queue time slope is either upward or constant, token pool adjustment process 10 may determine whether the data path latency is increasing. If the data path latency is increasing, token pool adjustment process 10 may increment 324 the token pool size for the storage system token pool by a second amount. If the data path latency is not increasing (e.g., constant or decreasing), token pool adjustment process 10 may decrement 326 the token pool size for the storage system token pool by the second amount.

In some implementations, incrementing or decrementing by the second amount may generally include a "gentle" increment or decrement. In some implementations, the determination of the second or "gentle" amount for incrementing or decrementing the token pool size may be based upon, at least in part, one or more hardware and/or software components of the storage system. For example, token pool adjustment process 10 may determine the second amount based upon, at least in part, the number of CPU cores, amount of cache memory, type of storage devices (e.g., hard disk or solid-state), number of storage devices, the type of storage protocol (e.g., SCSI, NVMe, etc.), etc. In some implementations, the second amount may be the same for either incrementing or decrementing the token pool size.

Referring again to FIG. 5 and in one example, suppose token pool adjustment process 10 determines 322 that at least one IO request has been queued since calibration, that the IO rate slope is constant (i.e., constant at 1000 IOPS), and that the IO queue time slope is either upward or constant (i.e., increase from 10 seconds to 12 seconds). In this example, token pool adjustment process 10 may satisfy the conditions of state 504 and may transition to state 504. Accordingly, token pool adjustment process 10 may determine whether the data path latency is increasing. If the data path latency is increasing, token pool adjustment process 10 may increment 324 the token pool size for the storage system token pool by the second amount (e.g., represented in FIG. 5 by "+"). If the data path latency is not increasing (e.g., constant or decreasing), token pool adjustment process 10 may decrement 326 the token pool size for the storage system token pool by the second amount (e.g., represented in FIG. 5 by "–"). As shown in the example of FIG. 5, token pool adjustment process 10 may iteratively determine whether the data path latency is increasing and, if so, may increment 324 the token pool size by the second amount and, if not, may decrement 326 the token pool size by the second amount, while the conditions of state 504 are met (e.g., IO rate slope is constant and IO queue time slope is either upward or constant).

In some implementations, dynamically adjusting 304 the token pool size for the storage system token pool associated with the storage system based upon, at least in part, the one or more changes in the IO processing load determined for the storage system may include determining that the IO rate slope is constant and that the IO queue time slope is downward. For example, token pool adjustment process 10 may determine that the IO rate slope is constant (i.e., the IO rate slope is flat) and that the IO queue time slope is downward (i.e., the IO queue time slope is negative). In some implementations, token pool adjustment process 10 may, in response to determining that the IO rate slope is constant and that the IO queue time slope is downward, take no action regarding the token pool size.

Referring again to FIG. 5 and in one example, suppose token pool adjustment process 10 determines that at least one IO request has been queued since calibration, that the IO rate slope is constant (i.e., constant at 1000 IOPS), and that the IO queue time slope is downward (i.e., decrease from 10 seconds to 8 seconds). In this example, token pool adjustment process 10 may satisfy the conditions of state 506 and may transition to state 506. Accordingly, token pool adjustment process 10 may take no action regarding the token pool size (e.g., represented in FIG. 5 by "none"). As shown in the example of FIG. 5, token pool adjustment process 10 may take no action regarding the token pool size while the conditions of state 506 are met (e.g., IO rate slope is constant and IO queue time slope is downward).

In some implementations, dynamically adjusting 304 the token pool size for the storage system token pool based upon, at least in part, the one or more changes in the IO processing load determined for the storage system may include determining that no IO requests have been queued since calibration and that the IO rate slope is constant or downward. For example, token pool adjustment process 10 may determine that no IO requests have been queued since calibration and that the IO rate slope is constant or downward (i.e., the IO rate slope is flat or negative). In some implementations, token pool adjustment process 10 may, in response to determining that no IO requests have been queued since calibration and that the IO rate slope is constant or downward, decrement the token pool size for the storage system token pool by the second amount.

Referring again to FIG. 5 and in one example, suppose token pool adjustment process 10 determines that no IO request have been queued since calibration and that the IO rate slope is constant or downward (i.e., 1000 IOPS). In this example, token pool adjustment process 10 may satisfy the conditions of state 508 and may transition to state 508. Accordingly, token pool adjustment process 10 may decrement the token pool size for the storage system token pool by the second amount (e.g., represented in FIG. 5 by "−"). As shown in the example of FIG. 5, token pool adjustment process 10 may iteratively decrement the token pool size by the second amount while the conditions of state 508 are met (e.g., no IO requests have been queued since calibration and IO rate slope is constant or downward).

In some implementations, dynamically adjusting 304 the token pool size for the storage system token pool based upon, at least in part, the one or more changes in the IO processing load determined for the storage system may include determining that no IO requests have been queued since calibration and that the IO rate slope is up. For example, token pool adjustment process 10 may determine that no IO requests have been queued since calibration and that the IO rate slope is upward (i.e., the IO rate slope is positive). In some implementations, token pool adjustment process 10 may, in response to determining that no IO requests have been queued since calibration and that the IO rate slope is upward, increment the token pool size for the storage system token pool by the second amount.

Referring again to FIG. 5 and in one example, suppose token pool adjustment process 10 determines that no IO request have been queued since calibration, that the IO rate slope is upward (i.e., increase from 1000 IOPS to 1200 IOPS), and that the data path latency is decreasing. In this example, token pool adjustment process 10 may satisfy the conditions of state 510 and may transition to state 510. Accordingly, token pool adjustment process 10 may increment the token pool size for the storage system token pool by the second amount (e.g., represented in FIG. 5 by "+"). As shown in the example of FIG. 5, token pool adjustment process 10 may iteratively increment the token pool size by the second amount while the conditions of state 510 are met (e.g., no IO requests have been queued since calibration, IO rate slope is upward, and data path latency is decreasing).

In some implementations, dynamically adjusting 304 the token pool size for the storage system token pool based upon, at least in part, the one or more changes in the IO processing load determined for the storage system may include determining that the IO rate slope is downward and that the IO queue time slope is one of upward and constant; and one of: incrementing the token pool size for the storage system token pool associated with the storage system by the second amount when the data latency is increasing; and decrementing the token pool size for the storage system token pool associated with the storage system by the second amount when the data path latency is one of decreasing and constant. For example, token pool adjustment process 10 may determine that the IO rate slope is downward (i.e., the IO rate slope is negative) and that the IO queue time slope is either upward or constant (i.e., the IO queue time slope is positive or constant). In some implementations, token pool adjustment process 10 may, in response to determining that the IO rate slope is downward and that the IO queue time slope is either upward or constant, increment the token pool size for the storage system token pool by a second amount when the data latency is increasing, or decrement the token pool size for the storage system token pool by the second amount when the data path latency is one of decreasing and constant.

In some implementations, in response to determining that the IO rate slope is downward and that the IO queue time slope is either upward or constant, token pool adjustment process 10 may determine whether the data path latency is increasing. If the data path latency is increasing, token pool adjustment process 10 may increment the token pool size for the storage system token pool by a second amount. If the data path latency is not increasing (e.g., constant or decreasing), token pool adjustment process 10 may decrement the token pool size for the storage system token pool by the second amount.

Referring again to FIG. 5 and in one example, suppose token pool adjustment process 10 determines that at least one IO request has been queued since calibration, that the IO rate slope is downward (i.e., decrease from 1000 IOPS to 800 IOPS), and that the IO queue time slope is either upward or constant (i.e., increase from 10 seconds to 12 seconds). In this example, token pool adjustment process 10 may satisfy the conditions of state 512 and may transition to state 512. Accordingly, token pool adjustment process 10 may determine whether the data path latency is increasing. If the data path latency is increasing, token pool adjustment process 10 may increment the token pool size for the storage system token pool by the second amount (e.g., represented in FIG. 5 by "+"). If the data path latency is not increasing (e.g., constant or decreasing), token pool adjustment process 10 may decrement the token pool size for the storage system token pool by the second amount (e.g., represented in FIG. 5 by "−"). As shown in the example of FIG. 5, token pool adjustment process 10 may iteratively determine whether the data path latency is increasing and, if so, may increment the token pool size by the second amount and, if not, may decrement the token pool size by the second amount, while the conditions of state 512 are met (e.g., IO rate slope is downward and IO queue time slope is either upward or constant).

In some implementations, dynamically adjusting 304 the token pool size for the storage system token pool based upon, at least in part, the one or more changes in the IO processing load determined for the storage system may include determining that the IO rate slope is upward and that the IO queue time slope is constant or downward. For example, token pool adjustment process 10 may determine that the IO rate slope is upward (i.e., the IO rate slope is positive) and that the IO queue time slope is constant or downward (i.e., the IO queue time slope is flat or negative). In some implementations, token pool adjustment process 10 may, in response to determining that the IO rate slope is upward and that the IO queue time slope is constant or downward, increment the token pool size for the storage system token pool by the second amount.

Referring again to FIG. 5 and in one example, suppose token pool adjustment process 10 determines that at least one IO request has been queued since calibration, that the IO rate slope is upward (i.e., increase from 1000 IOPS to 1200 IOPS), and that the IO queue time slope is constant or downward (i.e., decrease from 10 seconds to 8 seconds). In this example, token pool adjustment process 10 may satisfy the conditions of state 514 and may transition to state 514. Accordingly, token pool adjustment process 10 may increment the token pool size for the storage system token pool by the second amount (e.g., represented in FIG. 5 by "+"). As shown in the example of FIG. 5, token pool adjustment process 10 may iteratively increment the token pool size for the storage system token pool by the second amount while the conditions of state 514 are met (e.g., IO rate slope is upward and IO queue time slope is constant or downward).

In some implementations, token pool adjustment process 10 may allocate 328 one or more tokens from the storage system token pool for executing one or more IO requests based upon, at least in part, the token pool size and one or more priority levels associated with the one or more IO requests. In some implementations, token pool adjustment process 10 may allocate processing resources of a storage system to various volumes based upon a quality-of-service (QoS) priority. In some implementations, a QoS priority may generally include a priority level for processing IO requests associated with a particular volume. For example, suppose three QoS priority levels are assigned to volumes within a storage system (e.g., a high priority level, a medium priority level, and a low priority level). In this manner, IO requests for a volume with a priority level, may be associated with that volume's priority level.

As discussed above and in some implementations, token pool adjustment process 10 may use tokens to allocate processing resources of a storage system for a particular IO. In some implementations, token pool adjustment process 10 may allocate 328 one or more tokens from a storage system token pool for executing one or more IO requests based upon, at least in part, the token pool size and the one or more priority levels associated with the one or more IO requests.

Referring again to the example of FIG. 4 and in some implementations, suppose, as discussed above, token pool adjustment process 10 defines 300 a token pool size for storage system token pool 408. In this example, suppose token pool adjustment process 10 defines 300 a token pool size of e.g., 100 tokens for storage system token pool 408. In some implementations, the allocation 328 of the one or more tokens may be based upon the token pool size and the one or more priority levels. Returning to the above example, suppose the high priority level is configured for priority to e.g., 60% of the storage system's resources; the medium priority level is configured for priority to e.g., 30% of the storage system's resources; and the low priority level is configured for priority to e.g., 10% of the storage system's resources. In this example, token pool adjustment process 10 may allocate 328 e.g., 60 tokens to the high priority IO requests (i.e., IO requests associated with high priority volumes); 30 tokens to the medium priority IO requests (i.e., IO requests associated with medium priority volumes); and 10 token to low priority IO requests (i.e., IO requests associated with low priority volumes). While one example of allocating tokens based upon, at least in part, a token pool size of e.g., 100 tokens and e.g., three priority levels, it will be appreciated that any number of tokens may be allocated for any number of priority levels within the scope of the present disclosure.

According to conventional approaches, this allocation may not account for ever-changing front workloads and internal background processing jobs. Thus, getting the size of this token pool incorrectly may cause issues with the resource allocator that enforces QoS between volume priorities. For example, conventional approaches include executing a fixed number of requests per priority where more tokens are allocated for a higher priority. However, this approach crumbles quickly due to fluctuations in incoming IO and background load where lower priority IO requests can easily steal tokens or processing capacity from higher priority IO requests, leading to no QoS between priorities.

In some implementations and as discussed above, token pool adjustment process 10 may dynamically adjust 304 the token pool size for the storage system token pool based upon, at least in part, one or more changes to the IO processing load determined for the storage system. In this manner, fluctuations in incoming host IO and background IO may be accommodated by dynamically adjusting 304 the token pool size for the storage system token pool.

Referring again to FIG. 4 and returning to the above example three priority levels, suppose three volumes (e.g., volumes 412, 414, 416) are assigned a different priority level (e.g., volume 412 is assigned a high priority level; volume 414 is assigned a medium priority level; and volume 416 is assigned a low priority level). In this example, IO requests associated with each volume may be associated with the respective volume's priority level.

In some implementations, as storage system 12 executes IO requests associated with each priority level, the IO processing load determined for the storage system may change. In one example, suppose low priority IO requests execute much more quickly than high priority IO requests. In this example, tokens allocated to high priority IO requests may be used by low priority IO requests as the high priority IO requests are slower (in this example) than the low priority IO requests. However, a large number of high priority IO requests may then be received. Accordingly, based on the changes to the IO processing load, slower execution of and greater number of high priority IO requests being queued, token pool adjustment process 10 may dynamically adjust 304 the token pool size of the storage system token pool.

For example, suppose token pool adjustment process 10 determines 314 that the IO rate slope is upward and that the IO queue time slope is up, token pool adjustment process 10 may increment 316 the token pool size by a first amount. In this manner, token pool adjustment process 10 may add more tokens to the storage system token pool and, in the above example, may allow more tokens to be used for high priority IO requests. In this manner, token pool adjustment process 10 may continuously and dynamically adjust 304 the token pool size to account for changes in the IO processing load of the storage system.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    defining a token pool size for a storage system token pool associated with a storage system;
    determining an input/output (IO) processing load for the storage system, wherein determining the IO processing load for the storage system includes determining a data path latency, an IO rate, and an IO queue time for the storage system; and
    dynamically adjusting the token pool size for the storage system token pool associated with the storage system based upon, at least in part, one or more changes in the IO processing load determined for the storage system, wherein dynamically adjusting the token pool size for the storage system token pool associated with the storage system based upon, at least in part, the one or more changes in the IO processing load determined for the storage system includes:
        determining whether an IO rate slope is one of: up, downward, and constant;
        determining whether an IO queue time slope is one of: up, downward, and constant;
        determining whether the data path latency is one of: increasing, decreasing, and constant; and
        dynamically adjusting the token pool size for the storage system token pool associated with the storage system using a state machine defined with a plurality of IO processing load states based upon, at least in part, the IO rate slope, the IO queue time slope, and the data path latency, wherein the state machine is configured to transition between the plurality of IO processing load states in response to determining a change in one or more of the IO rate slope, the IO queue time slope, and the data path latency.

2. The computer-implemented method of claim 1, wherein dynamically adjusting the token pool size for the storage system token pool associated with the storage system based upon, at least in part, the one or more changes in the IO processing load determined for the storage system includes:
    determining that the IO rate slope is upward and that the IO queue time slope is up; and
    incrementing the token pool size for the storage system token pool associated with the storage system by a first amount.

3. The computer-implemented method of claim 1, wherein dynamically adjusting the token pool size for the storage system token pool associated with the storage system based upon, at least in part, the one or more changes in the IO processing load determined for the storage system includes:
    determining that the IO rate slope is down and that the IO queue time slope is down; and
    decrementing the token pool size for the storage system token pool associated with the storage system by the first amount.

4. The computer-implemented method of claim 1, wherein dynamically adjusting the token pool size for the storage system token pool associated with the storage system based upon, at least in part, the one or more changes in the IO processing load determined for the storage system includes:
    determining that the IO rate slope is constant and that the IO queue time slope is one of upward and constant; and one of:
        incrementing the token pool size for the storage system token pool associated with the storage system by a second amount when the data latency is increasing; and
        decrementing the token pool size for the storage system token pool associated with the storage system by the second amount when the data latency is one of downward and constant.

5. The computer-implemented method of claim 1, further comprising:
    allocating one or more tokens from the storage system token pool associated with the storage system for executing one or more IO requests based upon, at least in part, the token pool size and one or more priority levels associated with the one or more IO requests.

6. A computer program product residing on a non-transitory computer readable medium having a plurality of instructions stored thereon which, when executed by a processor, cause the processor to perform operations comprising:
    defining a token pool size for a storage system token pool associated with a storage system;
    determining an input/output (IO) processing load for the storage system, wherein determining the IO processing load for the storage system includes determining a data path latency, an IO rate, and an IO queue time for the storage system; and
    dynamically adjusting the token pool size for the storage system token pool associated with the storage system based upon, at least in part, one or more changes in the IO processing load determined for the storage system, wherein dynamically adjusting the token pool size for the storage system token pool associated with the storage system based upon, at least in part, the one or more changes in the IO processing load determined for the storage system includes:
        determining whether an IO rate slope is one of: up, downward, and constant;

determining whether an IO queue time slope is one of: up, downward, and constant;

determining whether the data path latency is one of: increasing, decreasing, and constant; and dynamically adjusting the token pool size for the storage system token pool associated with the storage system using a state machine defined with a plurality of IO processing load states based upon, at least in part, the IO rate slope, the IO queue time slope, and the data path latency, wherein the state machine is configured to transition between the plurality of IO processing load states in response to determining a change in one or more of the IO rate slope, the IO queue time slope, and the data path latency.

7. The computer program product of claim 6, wherein dynamically adjusting the token pool size for the storage system token pool associated with the storage system based upon, at least in part, the one or more changes in the IO processing load determined for the storage system includes:

determining that the IO rate slope is upward and that the IO queue time slope is up; and incrementing the token pool size for the storage system token pool associated with the storage system by a first amount.

8. The computer program product of claim 6, wherein dynamically adjusting the token pool size for the storage system token pool associated with the storage system based upon, at least in part, the one or more changes in the IO processing load determined for the storage system includes:

determining that the IO rate slope is down and that the IO queue time slope is down; and decrementing the token pool size for the storage system token pool associated with the storage system by the first amount.

9. The computer program product of claim 6, wherein dynamically adjusting the token pool size for the storage system token pool associated with the storage system based upon, at least in part, the one or more changes in the IO processing load determined for the storage system includes:

determining that the IO rate slope is constant and that the IO queue time slope is one of upward and constant; and one of:

incrementing the token pool size for the storage system token pool associated with the storage system by a second amount when the data latency is increasing; and decrementing the token pool size for the storage system token pool associated with the storage system by the second amount when the data latency is one of downward and constant.

10. The computer program product of claim 6, wherein the operations further comprise:

allocating one or more tokens from the storage system token pool associated with the storage system for executing one or more IO requests based upon, at least in part, the token pool size and one or more priority levels associated with the one or more IO requests.

11. A computing system comprising:

a memory; and a processor configured to define a token pool size for a storage system token pool associated with a storage system, wherein the processor is further configured to determine an input/output (IO) processing load for the storage system, wherein determining the IO processing load for the storage system includes determining a data path latency, an IO rate, and an IO queue time for the storage system, and wherein the processor is further configured to dynamically adjust the token pool size for the storage system token pool associated with the storage system based upon, at least in part, one or more changes in the IO processing load determined for the storage system, wherein dynamically adjusting the token pool size for the storage system token pool associated with the storage system based upon, at least in part, the one or more changes in the IO processing load determined for the storage system includes: determining whether an IO rate slope is one of: up, downward, and constant determining whether an IO queue time slope is one of: up, downward, and constant determining whether the data path latency is one of: increasing, decreasing, and constant and dynamically adjusting the token pool size for the storage system token pool associated with the storage system using a state machine defined with a plurality of IO processing load states based upon, at least in part, the IO rate slope, the IO queue time slope, and the data path latency, wherein the state machine is configured to transition between the plurality of IO processing load states in response to determining a change in one or more of the IO rate slope, the IO queue time slope, and the data path latency.

12. The computing system of claim 11, wherein dynamically adjusting the token pool size for the storage system token pool associated with the storage system based upon, at least in part, the one or more changes in the IO processing load determined for the storage system includes:

determining that the IO rate slope is upward and that the IO queue time slope is up; and incrementing the token pool size for the storage system token pool associated with the storage system by a first amount.

13. The computing system of claim 11, wherein dynamically adjusting the token pool size for the storage system token pool associated with the storage system based upon, at least in part, the one or more changes in the IO processing load determined for the storage system includes:

determining that the IO rate slope is down and that the IO queue time slope is down; and decrementing the token pool size for the storage system token pool associated with the storage system by the first amount.

14. The computing system of claim 11, wherein dynamically adjusting the token pool size for the storage system token pool associated with the storage system based upon, at least in part, the one or more changes in the IO processing load determined for the storage system includes:

determining that the IO rate slope is constant and that the IO queue time slope is one of upward and constant; and one of:

incrementing the token pool size for the storage system token pool associated with the storage system by a second amount when the data latency is increasing; and decrementing the token pool size for the storage system token pool associated with the storage system by the second amount when the data latency is one of downward and constant.

* * * * *